No. 664,208. Patented Dec. 18, 1900.
H. B. BERENDSEN.
MOTOR VEHICLE.
(Application filed Jan. 22, 1900.)

(No Model.)

UNITED STATES PATENT OFFICE.

HENRY BERNARD BERENDSEN, OF MILWAUKEE, WISCONSIN.

MOTOR-VEHICLE.

SPECIFICATION forming part of Letters Patent No. 664,208, dated December 18, 1900.

Application filed January 22, 1900. Serial No. 2,268. (No model.)

*To all whom it may concern:*

Be it known that I, HENRY BERNARD BERENDSEN, of Milwaukee, in the county of Milwaukee and State of Wisconsin, have invented a new and useful Improvement in Power-Transmitting and Speed-Reducing Mechanism for Motor-Driven Vehicles, of which the following is a description, reference being had to the accompanying drawings, which are a part of this specification.

The motors—whether electric, gas, compressed air, or others—that are adapted to be employed in vehicles or cars driven thereby are rapidly-running motors of small size, and in employing these motors for driving vehicles—either wagons, cars, or other vehicles in which traction-wheels are employed—it is necessary not only to transmit motion from the motor and the traction-wheels, but also to greatly reduce the speed of the motor before it is applied to the traction-wheels. To suitably and successfully accomplish this by mechanism of adequate strength, and yet in compact form, so as to be light in weight and adapted to be suitably placed in the vehicle, is the purpose of my improved construction.

My invention consists of the mechanism, its parts and combinations of parts, as herein described and claimed, or the equivalents thereof.

As my invention is adapted to be used in all kinds of vehicles in which traction-wheels are employed, I have shown it in connection with a buggy or automobile carriage for convenience of illustration.

Figure 1:
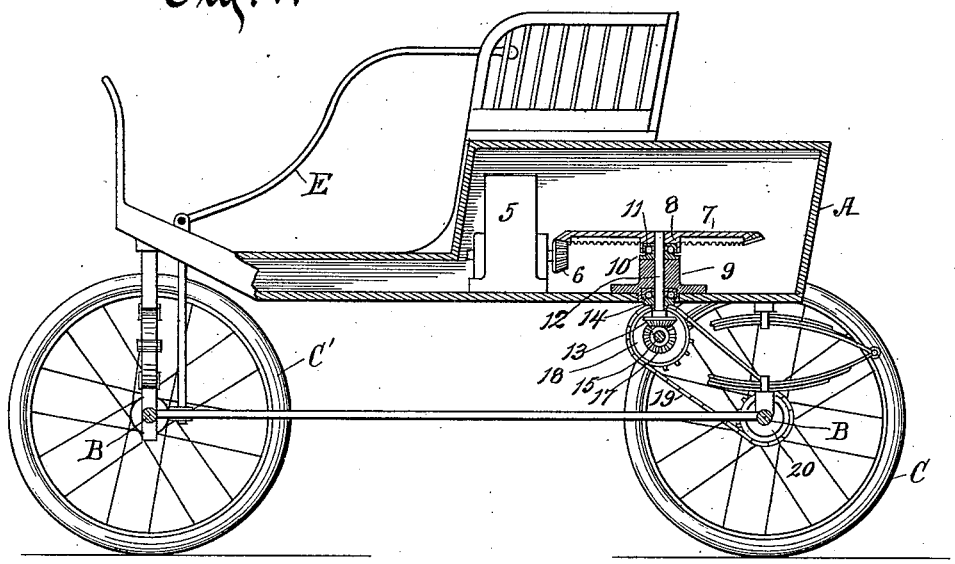
Figure 2:
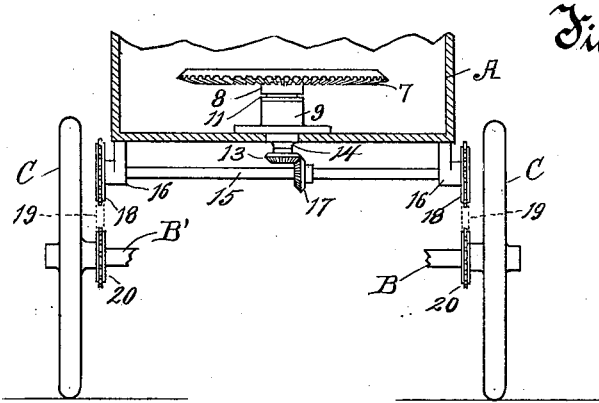

Figure 1 is a longitudinal vertical section of the principal parts of an automobile vehicle and of my improved mechanism therewith. Fig. 2 is a transverse section of a fragment of the vehicle-body with my improved mechanism and the rear wheels in elevation, parts being broken away for convenience of illustration.

In the drawings, A is the frame or body of the vehicle. This frame or vehicle-body is mounted on interposed yielding springs on axles B B', that are provided, respectively, with sets of wheels C C', fixed thereon. D is the reach, and E is the steering apparatus, adapted for controlling the direction of travel of the front wheels C' C', and thereby guiding the vehicle. These general features are in common use in automobile constructions and form no part of my invention.

A motor 5 is mounted on the frame of the vehicle and conveniently within the inclosed body or box of the vehicle, and its shaft is provided with a pinion 6, which, as in the case of all motors of this class, is a rapidly-rotating pinion. A large toothed wheel 7, and preferably a bevel-crowned toothed wheel, has a crown or end bearing for its hub 8 on a pedestal journal-box 9, which box rests on and is secured to the floor of the frame A. A steel cone ball-bearing member 10, fixed on the top of the pedestal-box 9, is the direct surface on the pedestal-box on which the hub of the wheel 7 is supported, and this ball-bearing member is complemented by an annular steel ball-bearing member 11 in the hub 8, between which ball-bearing members 10 and 11 steel bearing-balls are interposed in an annular way or track therefor about the axis of the wheel. The wheel 7 is provided with a fixed shaft 12, that extends through the journal-box 9 and is provided at its lower extremity with a beveled pinion 13. At the lower extremity of the journal-box 9 and at a distance from the member 10 the journal-box is provided with an annular steel ball-bearing cone about the shaft 12, and the shaft 12 is provided with a thereto-fixed annular steel ball-bearing cone 14, between which two last-named ball-bearings suitable steel balls are interposed, thereby providing a desirable antifriction ball-bearing for the shaft 12 in the journal-box 9 both near its attachment to the wheel 7 and at a distance therefrom in the box 9.

A transversely-disposed shaft 15 has its bearings in brackets 16 16, fixed to and depending from the frame or body A. This shaft is provided with a pinion 17, that meshes with the pinion 13 on the shaft 12. At its respective ends the shaft 15 is provided with sprocket-wheels 18 18, fixed thereto, and sprocket-chains 19 19, run thereon and on sprocket-wheels 20 20, fixed on the axle B, which axle is rigid in the traction rear wheels C C of the vehicle. It will be noted that the pinions 6, 13, and 17 are of comparatively small size, while the wheel 7 is of large size and is, in fact, for the purpose of reducing the speed of the motor, as large as can be readily employed in connection with the body of a vehicle. By this construction I am able not only with the minimum of loss of power by friction, but also with a proper reduction of speed, to transmit the rapid motion of the motor to the comparatively slowly moving traction-wheels of the vehicle.

What I claim as my invention is—

1. In combination in a vehicle, an inclosing body or box, a motor in and inclosed by the box, a horizontal motor-shaft provided with a pinion, a large horizontally-disposed wheel meshing with the pinion on the motor-shaft and provided with a vertical shaft, an upright pedestal journal-box supported in and with the large wheel inclosed by the box, the large horizontally-disposed wheel and its shaft being supported rotatably on the top of the pedestal journal-box, a pinion on the lower extremity of the vertical shaft below the pedestal journal-box, a horizontal shaft parallel with the traction-wheels' axle provided with a pinion meshing with the pinion on the vertical shaft, sprocket-wheels on the last-enumerated horizontal shaft, an axle with traction-wheels thereon, and sprocket-chains running on wheels rigid to the traction-wheels and on the sprocket-wheels on the horizontal shaft.

2. In a vehicle, the combination with a frame provided with traction-wheels and a motor mounted on the frame and having a horizontally-disposed rapidly-rotating shaft, of a large wheel in horizontal position geared to a small pinion on the horizontal shaft of the motor, a vertical shaft fixed in the large wheel, a pedestal journal-box fixed on the frame, ball-bearings in the journal-box between it and the hub of the large wheel and between it and the shaft at a distance from the hub of the wheel, another shaft parallel with the driven axle provided with a pinion gearing with the pinion on the vertical shaft of the large wheel and having a sprocket wheel or wheels thereon, and a sprocket chain or chains running on this shaft and on wheels on the axle of the traction-wheels.

3. In combination in a vehicle, an inclosing body or box, a motor in and inclosed by the box, a horizontal motor-shaft provided with a pinion, a large horizontally-disposed wheel meshing with the pinion on the motor-shaft and provided with a vertical shaft, an upright pedestal and journal-box supported in and with the large wheel inclosed by the box, the large horizontally-disposed wheel and its shaft being supported rotatably on the top of the pedestal journal-box, bearing-balls in ways therefor at the top of the pedestal journal-box adapted to support the large wheel and its vertical shaft both vertically and laterally, other bearing-balls in ways therefor at the base of the pedestal journal-box at a distance from the first-enumerated bearing-balls adapted to bear against the vertical shaft laterally and hold it to vertical position rotatably, a pinion on the lower extremity of the vertical shaft below the pedestal journal-box, a horizontal shaft parallel with the traction-wheels' axle provided with a pinion meshing with the pinion on the vertical shaft, sprocket-wheels on the last-enumerated horizontal shaft, an axle with traction-wheels thereon, and sprocket-chains running on wheels rigid to the traction-wheels and on the sprocket-wheels on the horizontal shaft.

In testimony whereof I affix my signature in presence of two witnesses.

HENRY BERNARD BERENDSEN.

Witnesses:
C. T. BENEDICT,
ANNA V. FAUST.